United States Patent
Wendelberger et al.

(10) Patent No.: US 11,803,176 B2
(45) Date of Patent: Oct. 31, 2023

(54) METHOD AND DEVICE FOR PLANNING A SPECIFIC PROCESS SYSTEM

(71) Applicant: Siemens Aktiengesellschaft, Munich (DE)

(72) Inventors: Klaus Wendelberger, St. Leon-Rot (DE); Andreas Geiger, Jockgrim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/765,963

(22) PCT Filed: Nov. 27, 2017

(86) PCT No.: PCT/EP2017/080538
§ 371 (c)(1),
(2) Date: Aug. 20, 2020

(87) PCT Pub. No.: WO2019/101345
PCT Pub. Date: May 31, 2019

(65) Prior Publication Data
US 2021/0048800 A1 Feb. 18, 2021

(51) Int. Cl.
*G05B 19/418* (2006.01)
*G05B 19/042* (2006.01)

(52) U.S. Cl.
CPC ..... *G05B 19/4188* (2013.01); *G05B 19/0426* (2013.01); *G05B 19/41865* (2013.01); *G05B 19/41885* (2013.01)

(58) Field of Classification Search
CPC ............ G05B 19/4188; G05B 19/0426; G05B 19/41865; G05B 19/41885
See application file for complete search history.

(56) References Cited

U.S. PATENT DOCUMENTS

2005/0198607 A1* 9/2005 Hoefler ............ G05B 19/41865
716/102
2006/0009866 A1 1/2006 Fritsch et al.
(Continued)

FOREIGN PATENT DOCUMENTS

EP 0770944 5/1997
EP 0770945 5/1997
(Continued)

OTHER PUBLICATIONS

Howie C et al: "Computer Interpretation of Process and Instrumentation Drawings", Progress Report 1, CIFE, Center for Integrated Facility Engineering, Stanford University, 1995.
(Continued)

*Primary Examiner* — Thomas C Lee
*Assistant Examiner* — Ameir Myers
(74) *Attorney, Agent, or Firm* — Cozen O'Connor

(57) ABSTRACT

A method and a device for planning a specific process system, wherein during the planning of a specific process system, which consists of primary technology formed as components of the system that are interconnected with respect to process and at least one secondary technology that depends on the primary technology and enables operation of the system together with the primary technology, the primary technology is planned as a flow diagram of the system via a system planning tool, where configuration data formed as requirements, guidelines for operation of the system, system-specific basic conditions and/or specifications are added to the flow diagram, and where a data-processing device evaluates the flow diagram to which the configuration data have been added and automatically creates, optionally by accessing an archive having standard planning solutions, a specific planning solution for a secondary technology that
(Continued)

meets the various requirements together with the planned primary technology.

9 Claims, 4 Drawing Sheets

(56) References Cited

U.S. PATENT DOCUMENTS

| | | | | |
|---|---|---|---|---|
| 2012/0078680 | A1* | 3/2012 | Tharp | G06Q 10/0635 |
| | | | | 705/1.1 |
| 2014/0039656 | A1 | 2/2014 | Humpert et al. | |
| 2014/0358817 | A1 | 12/2014 | Wendelberger | |
| 2015/0178422 | A1 | 6/2015 | McKim et al. | |
| 2015/0338171 | A1* | 11/2015 | Torres Sepúlveda | ........................ |
| | | | | F28D 15/043 |
| | | | | 165/104.26 |
| 2016/0125329 | A1* | 5/2016 | Nayar | G06Q 10/067 |
| | | | | 705/348 |
| 2016/0140265 | A1 | 5/2016 | Hoernicke | |
| 2016/0161930 | A1* | 6/2016 | Jirkovsk | G05B 19/4188 |
| | | | | 700/29 |
| 2016/0300001 | A1* | 10/2016 | Drumm | G06F 21/552 |
| 2017/0061031 | A1* | 3/2017 | Jammikunta | G06F 16/172 |
| 2017/0075332 | A1* | 3/2017 | Norman | G06F 9/5027 |
| 2017/0132332 | A1* | 5/2017 | Takamura | G06F 30/13 |
| 2017/0227954 | A1* | 8/2017 | Seki | G05B 13/041 |
| 2018/0314222 | A1 | 11/2018 | Hoernicke | |

FOREIGN PATENT DOCUMENTS

| | | |
|---|---|---|
| EP | 1048993 | 11/2000 |
| EP | 2671122 | 12/2013 |
| EP | 2787403 | 10/2014 |
| EP | 2795414 | 10/2014 |
| EP | 2827203 | 1/2015 |
| EP | 3029535 | 6/2016 |
| WO | 2009103089 | 8/2009 |
| WO | 2015135559 | 9/2015 |
| WO | 2017076420 | 5/2017 |

OTHER PUBLICATIONS

International PCT Search Report dated Aug. 29, 2018 based on PCT/EP2017/080538 filed Nov. 27, 2017.

* cited by examiner

METHOD AND DEVICE FOR PLANNING A SPECIFIC PROCESS SYSTEM

CROSS-REFERENCE TO RELATED APPLICATION

This is a U.S. national stage of application No. PCT/EP2017/080538 filed 27 Nov. 2017.

BACKGROUND OF THE INVENTION

1. Field of the Invention

The invention relates to a method and a device for project planning of a specific process system, where the term system also subsumes a subsystem as part of a larger system.

2. Description of the Related Art

In a process system, a distinction can be made between primary technology and secondary technology.

The primary technology comprises the structure of the system from a process or technology perspective, i.e., the process components of the system, such as containers, pumps, valves, heat exchangers and their connection to one another, in particular piping.

The planning or project planning of the primary technology is performed using a system planning tool (e.g., COMOS from Siemens) in the form of a flow diagram or piping diagram (piping and instrumentation (P&I) diagram) of the system, where graphical process objects that represent components of the process system are linked to one another. The specific process objects (instances of object classes) contain technical information about the parameters of the components they represent, such as piping diameter, power consumption of motors or the filling volume of a container. The P&I diagram can also already contain the sensors and actuators (measuring transducers and drives for final control elements) of the system with the technical information about the sensors and actuators, or the corresponding information can be entered in the system planning tool.

The secondary technology enhances the primary technology for the intended operation of the system, where different secondary technologies perform different functions during operation of the system.

An essential secondary technology is the automation of the system which, in turn, can be divided into different subareas such as automation software, automation hardware, operation & monitoring, the solutions to which have hitherto often been project-planned by different experts (automation engineers, project planners) such as a hardware engineer, software engineer, Human Machine Interface (HMI) engineer.

In addition to automation, the electrification of the system is important as a further secondary technology. All electrical system components, such as the motors in particular, must be supplied with electrical current. For this, the components of the electrification such as transformers, converters or switchgear, must be provided.

Examples of further secondary techniques include building technology or telecommunications.

The basis for the engineering of the automation and electrification is process system planning, where modern system planning tools such as the above-mentioned COMOS planning tool enable the integrated engineering of both the primary and secondary technology solutions (i.e., the process system planning and, for example, the automation) in a tool or a system environment, such that data that is required for various solutions only has to be entered once and is available in a consistent manner at all times.

An efficient method of reducing the effort involved in project planning or the creation of project planning documents such as function plans of open-loop and closed-loop controllers or operating screens and of improving the quality is standardization, where standards are generated that are used in the various projects time and again. Ideally, the standards are available in different versions so that they can be adapted to the requirements of the specific system. In engineering, only the appropriate standards in the corresponding version must then be selected and applied. Even if the complete engineering cannot be covered by standardization, because not all specific system requirements or special customer requests can be molded into one standard, a large part of the engineering (especially of the parts that are always identical from system to system) can be considerably simplified.

Another method of reducing the effort involved in project planning of solutions in the field of secondary technologies is to automate the work involved in project planning. Based on corresponding algorithms, the project planning solutions are automatically generated using the data from the system planning.

If, for example, the sensors and actuators of the system are already in a P&I diagram with the parameters relevant for automation, such as the beginning and end of the measuring range, type of connection (e.g., bus, wired), drive type (electric, pneumatic, hydraulic), then all the information necessary to be able to automatically generate the software for inputting measurement signals and outputting control signals is available.

However, this does not apply to higher-quality automation functions for closed-loop and open-loop control, locking or protection of the system, because the information required for this cannot be attached to a single system component, but is dependent on the structure of the system and its intended operation, in other words the process purpose which the system is to fulfill. In addition, different automation solutions may be required for automation due to other operational requirements, even if two systems have the identical process structure, i.e., are described by the same P&I diagram.

Ultimately, automatic generation of a project planning solution is only possible if all information upon which the project planning solution depends is available in a machine-readable form. For the automatic generation of project planning solutions for the various secondary technologies, in addition to the information about the process structure of the system, which is described in a P&I, information must also be available on the desired automatic system operation (e.g., operating modes of individual components available in automatic mode, as well as of the entire system, required automatic protection mechanisms, automatic operating optimization, dynamic system behavior), the desired manual system operation (e.g., provision of information for the system operator, available intervention options for the system operator), the system-specific framework conditions (e.g., spatial circumstances, distances) and the customer specification (e.g., products to be employed, properties of the products to be used).

EP 2 671 122 B1 discloses a method for the field of automation in which project planning documents are automatically generated, where a project planner creates various definition lists and specifies therein which specific structure of the process system to be automated is present and which customer-specific requirements have to be fulfilled. The entry in the various definition lists is made by answering yes/no questions or by entering numerical values. On this basis, an appropriate version of the standard project planning document is then selected from a database that contains standard project planning documents consisting of interlinked, adaptable project planning objects, in each case as a maximum version, and from which the system-specific project planning document is automatically generated by amending (e.g., deleting or deactivating) its project planning objects. A project planning document can be an open-loop or closed-loop control function plan, an operating screen for the system or a description of the system or system functionality.

EP 2 795 414 B1 discloses a method in which a system-specific project planning document is automatically generated from a reference project planning document of a technical system. A comparison of standard project planning objects with the reference project planning document can be performed automatically. This conventional method is based on the reference project planning document. The project planning of the control system software solution was already completed when the reference project planning document was created. The method specifies how this document can be transposed automatically into the specific automation system.

EP 0 770 944 B1 discloses a method for the automated generation of control structures for a specific control task. This conventional method is based on a P&I diagram of the system, where each component of the system shown has a data record that describes its properties. For the components, assemblies formed therefrom or the system, generally applicable formulated control tasks, "abstract generics", are recorded line by line in a knowledge base, specifying the place of action, processing, control condition and status of the condition. To generate the control structures for the specific system, for each abstract generix a search is made for places of action and control conditions in the P&I diagram that correspond to the description of the abstract generix. If appropriate places of action and control conditions are found in the P&I diagram, then a copy of the abstract generix with the information about the actual system components is specified. This conventional method is based on the fact that the abstract knowledge in the form of the preformulated generices is available to a sufficient extent. Control software structures can be generated that correspond in their basic structure to the structures defined in the abstract generices. Furthermore, the conventional method only considers one-dimensional structures because the places of action are searched for in the P&I diagram with the aid of the abstract formulation in the generices along a process route between a start and end component. With the known method, the same control structure always results for a particular system structure.

EP 0 770 945 B1 discloses the automated creation of a process diagram (P&I diagram) for a specific technical process, where an abstract process diagram with placeholders for components and connections is transposed into a specific diagram for the technical process by specifying the placeholders with specific components and connections. The generation of control solutions or other solutions from the field of secondary technology does not form the subject matter of the conventional method.

EP 1 048 993 B1 discloses a method for knowledge-based planning of a complex technical system, e.g., a technical system. In a first planning stage, the primary technology of the system is planned by creating a process diagram (P&I diagram) according to the method known from EP 0 770 945 B1 mentioned above. In a second planning stage based on the primary technology, one or more secondary technologies, such as the control system, the electrical equipment or the building are planned. On the basis of the project-planned primary technology, taking into account previously entered and saved system-wide specifications of the secondary technology and using secondary-technology-specific knowledge in the form of domain rules, execution-neutral and thus solution-system-independent secondary technology planning results are formulated. Such a domain rule can be, for example: "Each processing step of a step control has a start condition, a monitoring time and a step-enabling condition, or uniform error handling". The solution-system-independent secondary technology planning results can be used for further processing in, e.g., a planning tool of a specific solution system. The conventional method therefore allows automated project planning of a secondary technology, provided that this only depends on process system planning and on system-wide specifications of the secondary technology (predefined, secondary-technology-specific rules).

WO 2017/076420 A1 discloses a method for configuring the automation for a process system. Here, the starting point is also the P&I diagram of the system, in which representatives of the components of the system are connected to one another via lines. Interfaces for locking properties that, e.g., lead to deactivation of the component or prevent activation of the component are defined for the representatives of the system components. By analysis, e.g., image processing, of the P&I diagrams, a determination is made for the individual components regarding which other components they are connected to, where by analysis of the interfaces, the other components, more precisely their representatives, are selected that have locking properties that are relevant for the examined components. The selected representatives of the components are connected to one another at their interfaces, where a flow logic for the automation of these components is then automatically generated. Considered generally, control structure components, such as a closed-loop control structure, can be part of the P&I diagram and connected to the system components. To generate the flow logic, these structure components are treated in the same way as the system components. The conventional method can thus be used to generate control software structures that are initially one-dimensional in the sense that the interface of one component can only ever be connected to an interface of another component. However, several parallel one-dimensional structures are possible, in this case. The generation of multi-dimensional structures, such as a multiply nested logical combination of signals or signal processing (e.g., with timing elements, limit value formations) or closed-loop control structures is possible using control structure components. Software structures can then be generated which correspond in their basic structure to the structure components. The knowledge must therefore be sufficiently available in the form of the pre-formulated structure components.

EP 2 787 403 A1 describes a method for automatically creating an automation program from a technological description of an automation solution for a process system. While the technological description and the automation program have hitherto been created by different experts (technologists, automation engineers), now only the technological description has to be created, while the automation program is generated by a software tool that processes the technological description. The technological description defines the technical devices comprised by the system, the functionalities of the devices and, in the form of "actions and transitions", functional relationships of the technical devices comprised by the system. The technological description of the automation solution is available in a machine-readable form in a predefined format and is automatically analyzed. Such a format can be based, for example, on the International Society of Automation (ISA) standard 88 (ISA-88) (International Electrotechnical Commission (IEC) 61512-1) or the NAMUR recommendation NE 33. For the automatic transposition of the technological description of the automation solution, interpreter modules and mapping rules that can be used to generate the automation program are provided in a program library for transposing the technological description into a basic program. Automation programs (control software solutions) in the form of a basic program and interpreter modules that can be retrieved from the basic program can be generated with the known method. The basic program consists of a sequence of ordered data records that have fixed structures, and the interpreter modules contain predefined device-specific program code. Functionally, the generated sequential program always corresponds to a sequence of actions and transitions.

SUMMARY OF THE INVENTION

It is an object of the invention to provide a method and a device which, based on the primary technology of a system project-planned in a flow diagram, permits automatic project planning of a secondary technology, such as automation software, automation hardware, operation & monitoring, and/or electrification.

This and other objects and advantages are achieved in accordance with the invention by a method for project-planning a specific process system, which consists of a primary technology in the form of components of the system connected to one another using process technology and at least one secondary technology dependent on the primary technology and together therewith permitting operation of the system, where the primary technology is project-planned by creating a flow diagram of the system using a system planning tool by linking graphical process objects representing the components of the technical system, using the system planning tool, the flow diagram is supplemented by configuration data in the form of requirements and/or specifications for the operation of the system, system-specific framework conditions and/or specifications and using a data processing device, a specific project planning solution is automatically created for a secondary technology that fulfills the various requirements, together with the project-planned primary technology, by automatically evaluating the flow diagram supplemented with the configuration data.

It is also an object of the invention to provide a device for the project-planning of a specific process system, which consists of a primary technology in the form of components of the system connected to one another using process technology and at least one secondary technology dependent on the primary technology and together therewith permitting operation of the system, where the device includes a system planning tool that contains a specific project planning document of the primary technology in the form of a flow diagram of the system, which is supplemented by configuration data in the form of requirements and/or specifications for the operation of the system, system-specific framework conditions and/or specifications, and a data processing device that is designed to automatically create a specific project planning solution for a secondary technology which fulfills the various requirements, together with the project-planned primary technology, by automatically evaluating the flow diagram supplemented with the configuration data.

In accordance with the invention, all information necessary for automatic project planning of a secondary technology, such as the operational requirements for automated and manual system operation, the system-specific framework conditions and/or the specifications as part of an expanded system planning, are defined in a flow diagram that is expanded or supplemented by this information (configuration data).

The flow diagram is supplemented by the configuration data, preferably in the form of active lines between graphical process objects of the flow diagram, diagrams and/or standardized tables, where the configuration data can be evaluated directly for the automatic generation of the specific project planning solution. For example, by entering an active line between a measuring point, e.g., level measuring point, and a component, e.g., a pump, it is possible to define in the flow diagram that the level should be regulated by adjusting the pump output in the outflow of a container.

The secondary technology solutions to be generated depend only on the expanded system planning and can be generated independently of predefined structures, such as predefined standards. For the automation software, for example, any structures such as multidimensional, logical links, sequential controls, switching logic or closed-loop control structures, can be generated. Using the inventive method or the inventive device, it is also possible to project-plan secondary technology partial solutions, e.g., when changes are made to an existing system.

The specific project planning solution for the secondary technology is automatically generated based on the configuration data in the created flow diagram and by accessing secondary technology knowledge. The secondary technology knowledge that is stored in a data processing device can, in particular, be basic knowledge for the creation of secondary technology partial solutions that are independent of the specific primary technology, such as the project planning of a closed-loop control structure in the case of a guide variable, closed-loop control variable and manipulated variable given by the configuration data. Hence, it is possible to generate secondary technology solutions purely on the basis of the information provided by the flow diagram with its configuration data, i.e., without using ready-made standard solutions.

As an alternative and/or in addition, an archive with standard project planning solutions can also be accessed during the generation of individual project planning solutions. This can be desirable for those areas in which solutions are practically independent of specific system planning and the one-off definition of a generally applicable standard is associated with little effort, such as the one-off definition of the connection technology between an automation processor with input/output modules. Another instance of the use of an archive for standard solutions is the definition of extraordinary software structures that are supposed to use human intelligence to solve a very specific problem.

Different standard flow diagrams of systems and/or system parts can additionally be stored in the archive, which are at least partially provided with one or more versions of standard configuration data and/or with which versions of standard project planning solutions are associated. On the basis of the flow diagram created or a part thereof, an appropriate standard flow diagram or a part thereof can be determined by pattern recognition. As an example, a subsystem consisting of a pump, a minimum quantity valve connected in parallel, a downstream gate valve and a pressure and mass flow measurement can be mentioned. In accordance with the invention, such a subsystem can be automatically recognized in a flow diagram. Such subsystems can consist of a small number of individual components but also comprise large systems up to a complete system.

Based on the primary technology project-planned in a flow diagram and the standard flow diagram associated using pattern recognition, the operational requirements, of which there can be several versions, can be displayed to the system planner as a suggestion to supplement the flow diagram that the system planner has created. In addition, based on the configuration data contained in the flow diagram created, an appropriate version of the standard project planning solutions associated with the standard flow diagram determined can be determined.

The developments described relate both to the inventive method and to the device.

Where in the present application mention is made of systems, flow diagrams and solutions, this also includes individual independent or interconnected (or to be connected) partial systems, partial flow diagrams and partial solutions.

The invention and the developments described can be implemented both in software and in hardware, for example using a special electrical circuit.

Furthermore, an implementation of the invention or a development described is possible through a computer-readable storage medium upon which a computer program is stored which executes the invention or the development.

The invention and/or every development described can also be implemented by a computer program product which has a storage medium on which a computer program is stored which executes the invention and/or the development.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the figures, exemplary embodiments of the invention are shown, which are explained in greater detail below, in which.

DETAILED DESCRIPTION OF THE EXEMPLARY EMBODIMENTS

Figure 1:
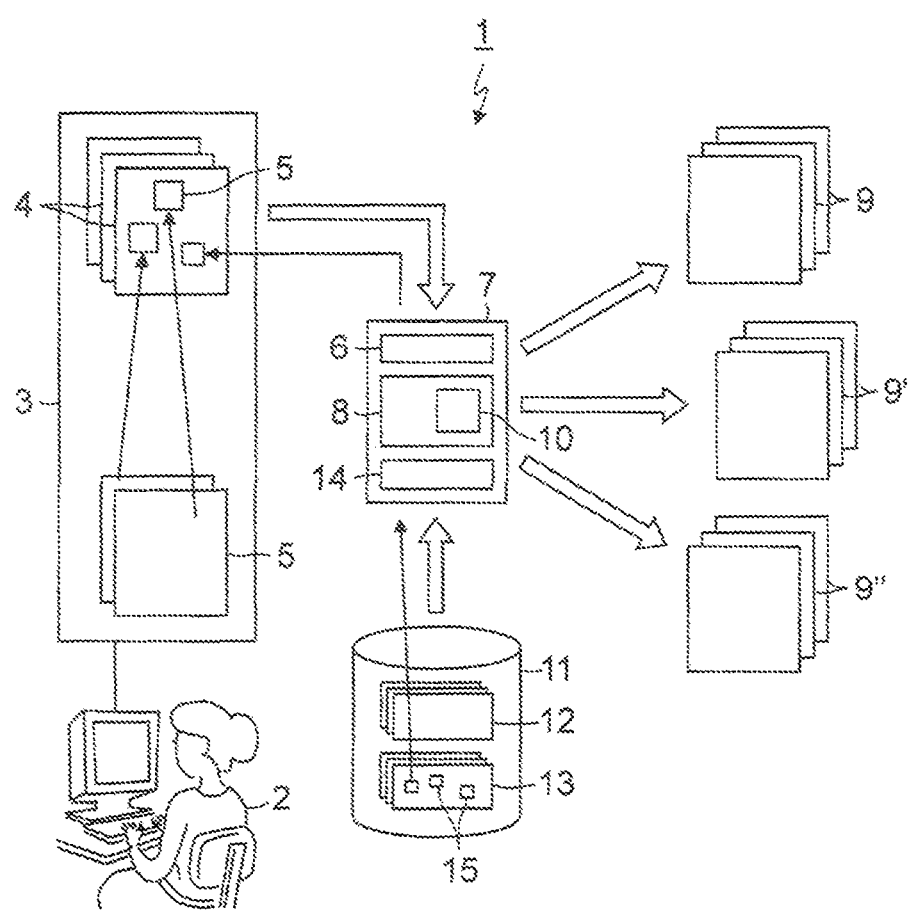
FIG. 1 a device for project planning of a specific process system in accordance with the invention.

FIG. 1 shows a device 1 for project planning of a specific process system, not shown here, which consists of a primary technology in the form of components of the system connected to one another using process technology and at least one secondary technology that is dependent on the primary technology and together therewith permits operation of the system, e.g., automation software, operation and monitoring of the system, automation hardware and electrification.

The primary technology is project-planned in that a flow diagram or piping diagram (P&I diagram) 4 of the system which, where appropriate, may consist of several partial images, is created in a known manner by a user 2 (system planner, technologist) by linking graphical process objects representing the components of the technical system using a system planning tool 3.

Using the system planning tool 3, the user 2 supplements the flow diagram 4 with configuration data 5 in the form of requirements and/or specifications for operation of the system, system-specific framework conditions and/or specifications.

An evaluation unit 6, as part of a data processing device 7, evaluates the flow diagram 4 supplemented with the configuration data 5. On the basis of this, a generating unit 8, which is likewise part of the data processing device 7, then automatically generates a specific project planning solution 9, 9', 9" for a secondary technology that fulfills the various requirements together with the project-planned primary technology. In the example shown, 9 for example designates a project planning solution for the automation software, 9' a project planning solution for the operation and monitoring of the system and 9" a common project planning solution for the automation hardware and electrification.

Secondary technology knowledge 10 is stored in the generating unit 8, based on which an automatic generation of the secondary technology solutions 9, 9', 9" is possible, solely based on the flow diagrams 4 with the configuration data 5. Alternatively and/or additionally, the generation unit 8 can access an archive 11 containing standard project planning solutions 12 and generate the secondary technology solutions 9, 9', 9" based on the standard solutions 12. The archive 11, which where appropriate includes several distributed databases, contains different standard flow diagrams 13 of systems and/or system parts, with which the standard project planning solutions 12 are associated. In an optional step, a standard flow diagram 13 that matches the flow diagram 4 or a part thereof can be determined in a unit for pattern recognition 14, which is part of the data processing device 7. On the basis of the configuration data 5 contained in the flow diagram 4 created, one or more appropriate standard project planning solutions 12 can ultimately be determined for the standard flow diagram 13 determined in this way and can be displayed to the user 2 for selection.

The standard flow diagrams 13 can also contain one or more versions of standard configuration data 15, with which the flow diagram 4 created during the project planning of the primary technology can be supplemented. If a flow diagram 4 that has not yet been configured or is incompletely configured is present, the unit for pattern recognition 14 can be used to automatically check whether corresponding subsystems or system parts are already described in the archive 11 by standard ready-configured flow diagrams 13 available there. If this is the case, then the already defined versions of configuration data 15 can be displayed to the user 2 for selection. Here, the user 2 does not have to perform any activities that go beyond system planning, as long as the available standard configuration data is also applicable for the system of the user.

From the perspective of the user, only system planning occurs, i.e., the project planning of the primary technology of the system, which is augmented in a configuration step with the information required for automatic generation of all specific project planning solutions of the secondary technology.

Figure 2:
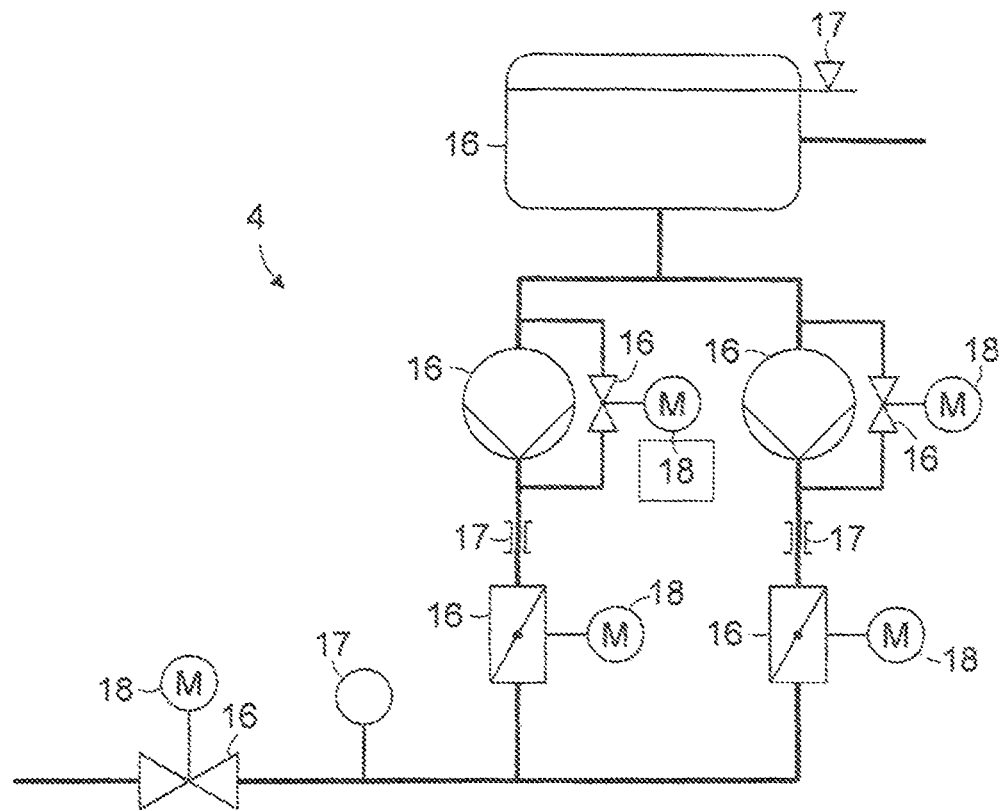
FIG. 2 a flow diagram of the system in accordance with the invention.

FIG. 2 shows a simplified example of the flow diagram 4 project-planned as part of the system planning. The flow diagram 4 contains graphical process objects 16 that represent different components of the system, such as pumps, containers, valves, and which are linked to one another corresponding to the piping of the system. The process objects 16 contain technical information about the parameters of the components they represent, such as pipeline diameter or filling volume of a container. The flow diagram 4 shown here also contains the sensors 17 and actuators 18 of the system with the corresponding technical information, based on which the software for inputting measurement signals and outputting control signals can be generated automatically.

In the following, FIG. 3 explains by way of example how the additional information or configuration data 5 for the automatic generation of a secondary technology can be added to the system planning. Both the listed configuration data and the way in which the additional information or configuration data 5 can be entered into the flow diagram 4 are only presented for better explanation and are to be understood as examples and are not to be understood as a restriction of the invention.

Figure 3:
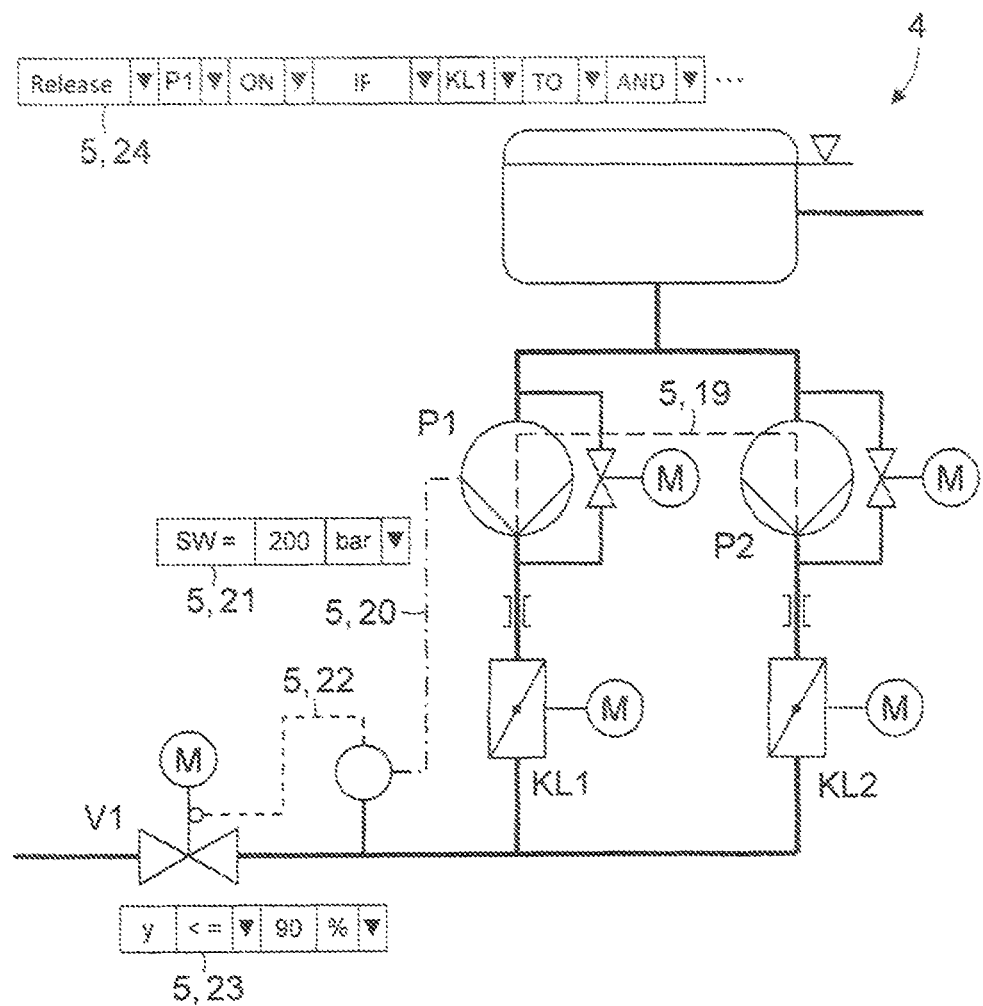
FIG. 3 is a supplementation of the flow diagram of FIG. 2 with configuration data.

FIG. 3 shows the flow diagram 4 from FIG. 2 which, after entry of the corresponding configuration data 5, contains further information that is required for generating secondary technologies. This information is given from a purely technological perspective, i.e., the operator 2 merely, for example, specifies how the system is to be operated in automatic mode without having to know the background of an automation system or having to have knowledge of the structure of open-loop or closed-loop control functions. Such information must be provided by the system planner 2 in any case. The system planner 2 can now enter the corresponding information directly into the flow diagram 4. The transposition of these specifications into a secondary technology, such as the software of an automation system, in other words automation engineering, can then be performed automatically in the digital system environment.

The configuration data 5 to be specified here includes:

Redundancy or area splitting active lines 19 to indicate which units are redundant with respect to one another or additionally work in different operating ranges. For example: two pumps P1, P2 are redundant in respect of one another and are operated in parallel if both pumps P1, P2 are running.

Closed-loop control active lines 20 for indicating which measurement variable (closed-loop control variable) is regulated by which actuator (final controlling element). For example: the pressure in the line is regulated with the pump P1. In the example the pumps P1 and P2 are defined as redundant in respect of one another. As a result, the active line 20 simultaneously shows that the pressure is regulated by the pump P2 if the pump P1 is not running, and that both pumps P1, P2 regulate the pressure together if both pumps are running.

Setpoint values 21 for the closed-loop control active lines 20, where the user 2 can enter values and select units from a menu.

Limiting active lines 22 for indicating which measured variables limit the regulation of which closed-loop control variables. For example: the pressure in the line must be set such that valve V1, which regulates the mass flow, does not reach the limits of its operating range.

Limit value specifications 23 for the limiting active lines, where the user 2 can enter values and select comparison operands and units from corresponding menus.

Logic specifications 24 from a technological perspective, where the user 2 can select the modules of the logic specification from corresponding menus. For example: the pump P1 can only be switched on when the valve KL1 is closed.

Further examples of configuration data 5 that can be indicated in the flow diagram 4 are fault active lines of the closed-loop control technology, information on automatically starting and stopping the system such as the activation and deactivation sequences of units, parameters that influence the secondary technology, such as characteristic curves of units, running times of valves, power consumption of drives, labeling of objects that are to be shown on an operating screen, labeling of information that should be made available to the system operator, such as signals for curve images, alarms, system-specific framework conditions, such as spatial conditions, distances, specifications, such as products to be employed, properties of the products to be used.

It should be noted here that this information 5 must always be specified by the system planner 2. In accordance with the present invention, these specifications can be made in an integrated system 1, and further work steps for the project planning of the secondary technology are then no longer necessary.

Certain configuration data 5 can have an effect on several areas of secondary technology. For example, the statement that two pumps are redundant with respect to one another impacts on among other things the closed-loop and open-loop control structures of the two pumps, on the assignment of the input/output modules of the automation hardware, on the design and assignment of the busbars in the electrification, on the preparation of information and design of the operating options for the system operator.

Figure 4:
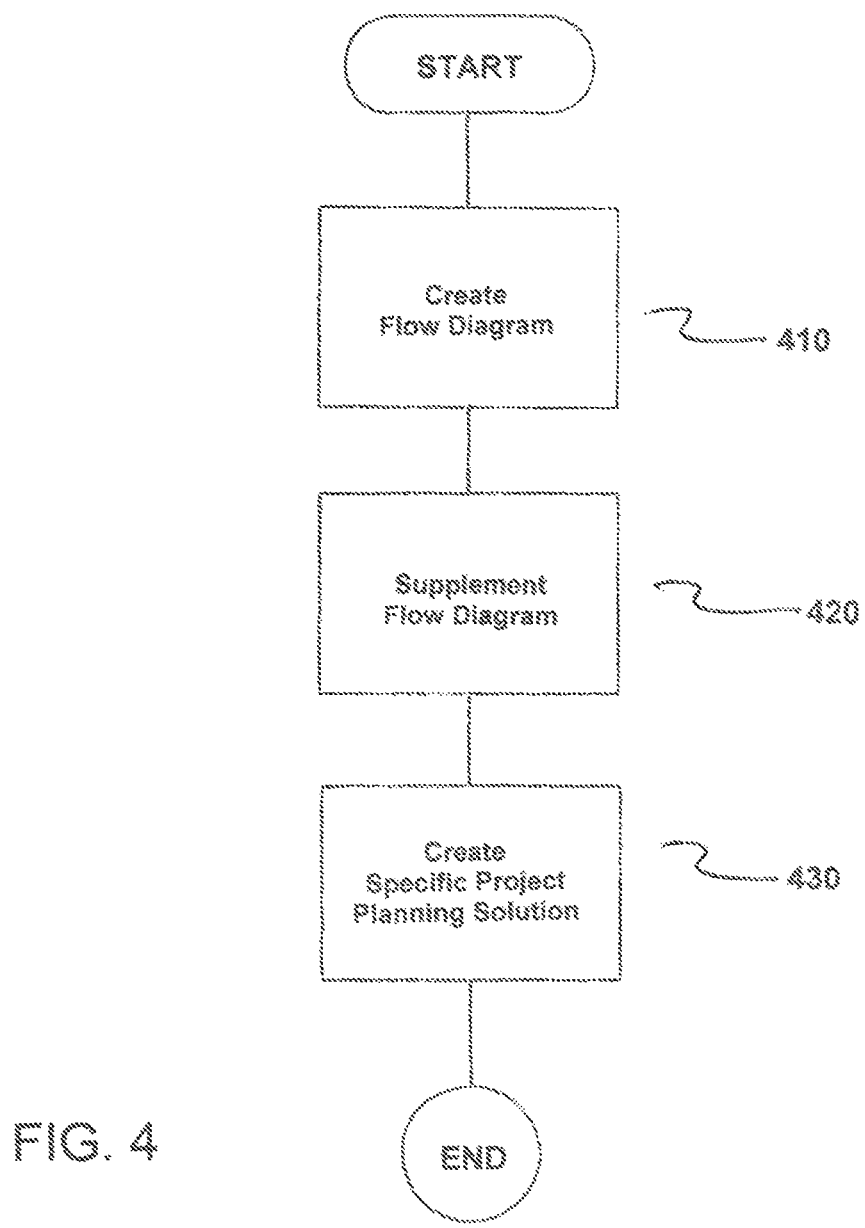
FIG. 4 is a flowchart of the method in accordance with the invention.

FIG. 4 is a flowchart of the method for project-planning of a specific process system comprising a primary technology formed as components of the specific process system connected to one another utilizing process technology and at least one secondary technology dependent on the primary technology and together therewith enables operation of the specific process system. The method comprises creating a flow diagram 4 of the specific process system utilizing a system planning tool 3 by linking graphical process objects 16 representing the components of a technical system to project-plan the primary technology, as indicated in step 410.

Next, the system planning tool 3 is utilized to supplement the flow diagram 4 by configuration data 5 formed as at least one of (i) requirements, (ii) specifications for operation of the specific process system, (iii) system specific framework conditions and (iv) specifications, as indicated in step 420.

Next, a specific project planning solution 9, 9', 9" is created automatically, by a data processing device 7, for a secondary technology which fulfills various requirements, together with the project planned primary technology, by automatically evaluating the flow diagram 4 supplemented with the configuration data 5, as indicated in step 430.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention.

For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for configuring a specific process system comprising a primary technology formed as components of the specific process system connected to one another utilizing process technology and at least one secondary technology dependent on the primary technology and together therewith enables operation of the specific process system, the method comprising:
   creating a piping and instrumentation (P&I) diagram of the specific process system utilizing a system planning tool by linking graphical process objects representing the components of a technical system to project-plan the primary technology;
   utilizing the system planning tool to supplement the P&I diagram by configuration data formed as at least one of (i) requirements, (ii) specifications for operation of the specific process system and (iii) system-specific framework conditions and (iv) specifications; and
   creating automatically, by a data processing device, a specific project planning solution for a secondary technology which fulfills various requirements, together with the project-planned primary technology, and by automatically evaluating the P&I diagram supplemented with the configuration data;
   creating and operating the technical system based on the created specific project planning solution for the secondary technology which fulfills the various requirements;
   wherein the P&I diagram is supplemented by the configuration data formed as at least one of (i) standardized tables, (ii) diagrams and (iii) active lines between graphical process objects.

2. The method as claimed in claim 1, wherein the secondary technology to be project-planned comprises at least one of (i) automation software, (ii) automation hardware, (iii) operation & monitoring and (iv) electrification of the system.

3. The method as claimed in claim 1, wherein the data processing device automatically generates the specific project planning solution for the secondary technology based on the configuration data in the created P&I diagram and by accessing secondary technology knowledge.

4. The method as claimed in claim 1, wherein the data processing device automatically generates the specific project planning solution for the secondary technology based on the configuration data in the created P&I diagram and by accessing standard project planning solutions provided in an archive.

5. The method as claimed in claim 4, wherein the standard project planning solutions are provided in different versions formed as at least one of (i) total solutions and (ii) partial solutions.

6. The method as claimed in claim 5, wherein different standard P&I diagrams of at least of one (i) systems and (ii) system parts together with associated versions of standard project planning solutions are further provided in the archive;
   wherein pattern recognition is utilized to determine an appropriate standard P&I diagram during automatic evaluation of the created P&I diagram; and
   wherein an appropriate version is determined from versions of standard project planning solutions associated with the determined standard P&I diagram based on the configuration data contained in the created P&I diagram.

7. The method as claimed in claim 1, wherein different standard P&I diagrams of at least one of (i) technical systems are provided in an archive, (ii) system parts are provided in an archive, and versions are at least partially provided with at least one version of standard configuration data;
   wherein an appropriate standard P&I diagram is determined utilizing pattern recognition during automatic evaluation of the created P&I diagram; and
   wherein the standard configuration data belonging to the determined appropriate standard P&I diagram is displayed in the created P&I diagram as a suggestion for supplementing the P&I diagram.

8. A device for configuring a specific process system comprising a primary technology formed as components of the specific process system connected to one another utilizing process technology and at least one secondary technology dependent on the primary technology and together therewith enables operation of the specific process system, the device comprising:
   a system planning tool containing a specific project planning document of the primary technology formed as a piping and instrumentation (P&I) diagram of the specific process system which is supplemented by configuration data comprising at least one of (i) requirements and (ii) specifications for operation of the specific process system, (iii) system-specific framework conditions and (iv) specifications; and
   a data processing device configured to automatically create a specific project planning solution for a secondary technology which fulfills various requirements, together with project-planned primary technology, by automatically evaluating the P&I diagram supplemented with the configuration data;
   wherein the P&I diagram is supplemented by the configuration data formed as at least one of (i) standardized tables, (ii) diagrams and (iii) active lines between graphical process objects; and
   wherein the technical system is created and operated based on the created specific project planning solution for the secondary technology which fulfills the various requirements.

9. The device as claimed in claim 8, wherein the device is configured to:
   create the P&I diagram of the specific process system utilizing a system planning tool by linking graphical process objects representing the components of a technical system to project-plan the primary technology;
   utilize the system planning tool to supplement the P&I diagram by configuration data formed as at least one of (i) the requirements, (ii) the specifications for operation of the specific process system and (iii) the system-specific framework conditions and (iv) the specifications; and
   create automatically, by the data processing device, the specific project planning solution for the secondary technology which fulfills the various requirements, together with the project-planned primary technology, by automatically evaluating the P&I diagram supplemented with the configuration data.

* * * * *